(12) United States Patent
Ouvrier-Buffet et al.

(10) Patent No.: US 9,217,674 B2
(45) Date of Patent: Dec. 22, 2015

(54) BOLOMETRIC DETECTOR OF AN ELECTROMAGNETIC RADIATION IN THE TERAHERTZ RANGE AND ARRAY DETECTION DEVICE COMPRISING SUCH DETECTORS

(71) Applicant: Commissariat A L'Energie Atomique Et Aux Energies Alternatives, Paris (FR)

(72) Inventors: Jean-Louis Ouvrier-Buffet, Sevrier (FR); Jérôme Meilhan, Grenoble (FR); Duy Thong Nguyen, Fontaine (FR); François Simoens, Claix (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 0 days.

(21) Appl. No.: 13/952,851

(22) Filed: Jul. 29, 2013

(65) Prior Publication Data
US 2014/0048708 A1    Feb. 20, 2014

(30) Foreign Application Priority Data
Aug. 20, 2012  (FR) ...................................... 12.57890

(51) Int. Cl.
*G01J 5/00*   (2006.01)
*G01J 5/24*   (2006.01)
(Continued)

(52) U.S. Cl.
CPC ................. *G01J 5/24* (2013.01); *G01J 5/0837* (2013.01); *G01J 5/22* (2013.01)

(58) Field of Classification Search
CPC ......... G01J 5/0837; G01J 5/20; G01J 5/0225; G01J 5/08; G01J 5/0803; G01J 5/0853; G01J 5/10; G01J 5/22; G01J 5/24

USPC .............. 250/338.1–338.5, 341.1–341.8, 340
See application file for complete search history.

(56) References Cited

U.S. PATENT DOCUMENTS 6,329,655 B1   12/2001   Jack et al.
7,884,329 B2 *  2/2011   Huppertz et al. .......... 250/338.4
(Continued)

FOREIGN PATENT DOCUMENTS

EP        1 431 731 A1        6/2004
EP        2 246 677 A1       11/2010
WO    WO 2012056124 A1 *     5/2012

OTHER PUBLICATIONS

R. Perez, "*Contribution à l'analyse théorique et expérimentale de radargrammes GPR : performances des antennes : apports d'une configuration multistatique*," doctoral thesis, Université de Limoges, dated Oct. 10, 2005 (164 pages).

(Continued)

*Primary Examiner* — David J Makiya
*Assistant Examiner* — Taeho Jo
(74) *Attorney, Agent, or Firm* — Burr & Brown, PLLC (57) ABSTRACT

A terahertz detection device comprises at least one terahertz antenna, a detection microbridge suspended above a substrate comprising a resistive load coupled to the antenna and a resistive bolometric element coupled to the resistive load, a bias circuit for biasing the bolometric element. The device further comprises a skimming microbridge suspended above the substrate, comprising a resistive bolometric element, and substantially identical to the detection microbridge, a reflective metal layer opposite to the skimming microbridge to obtain a destructive interference at the level of the skimming microbridge for a terahertz wavelength, a bias circuit to electrically bias the bolometric element of the skimming microbridge and a read circuit for measuring a difference between the electric signals of the microbridges.

12 Claims, 8 Drawing Sheets

(51) Int. Cl.
*G01J 5/08* (2006.01)
*G01J 5/22* (2006.01)

(56) References Cited

U.S. PATENT DOCUMENTS

| | | | |
|---|---|---|---|
| 8,373,123 B2* | 2/2013 | Ouvrier-Buffet | 250/338.1 |
| 8,816,283 B2* | 8/2014 | Yon et al. | 250/338.4 |
| 2010/0224787 A1* | 9/2010 | Huppertz et al. | 250/370.15 |
| 2010/0276597 A1* | 11/2010 | Ouvrier-Buffet | 250/349 |
| 2011/0057107 A1* | 3/2011 | Agnese et al. | 250/338.3 |
| 2012/0018635 A1* | 1/2012 | Takizawa et al. | 250/338.3 |
| 2013/0082181 A1* | 4/2013 | Corcos et al. | 250/349 |
| 2013/0240738 A1* | 9/2013 | Yon et al. | 250/349 |

OTHER PUBLICATIONS

Nguyen et al., "*Simulations and Measurements of the Electromagnetic Response of Broadband THz Uncooled Antenna-coupled Microbolometer Array*," dated May 1, 2012 (6 pages).
French Search Report, dated May 31, 2013 (3 pages).

* cited by examiner

Fig. 1
State of the art

Fig. 2
State of the art

Fig. 3

State of the art

Fig. 6

Fig. 4
(State of the art)

Fig. 5

(State of the art)

BOLOMETRIC DETECTOR OF AN ELECTROMAGNETIC RADIATION IN THE TERAHERTZ RANGE AND ARRAY DETECTION DEVICE COMPRISING SUCH DETECTORS

FIELD OF THE INVENTION

The present disclosure relates to the field of bolometric detectors with antennas, intended for the detection of an electromagnetic radiation in the terahertz range.

For a detection in the terahertz range, that is, in the frequency range comprised between approximately 100 gigahertz and approximately 10 terahertz, non-limiting applications of the invention relate to:
- medical diagnosis, for which the detection in the terahertz ranges provides access to anatomical structure details and the chemical reactions occurring therein, which are neither provided by X rays, nor by ultrasounds;
- the military field and air security, with, for example, the forming of anti-stealth radars or of high-resolution radars allowing a discrimination;
- the study and the detection of air pollution, submillimetric wave observation effectively providing important information relative to air chemistry and thus allowing an unequaled follow-up of air pollutants, such as for example nitrogen trioxide, which is not easily detectable by conventional techniques since it has strong absorption stripes in far infrared;
- the identification of chemical species, many complex chemical components having a sufficiently univocal signature in the terahertz range to be detectable with certainty, such as for example certain explosives and toxic products, certain compounds originating from the ripening of fruit or also certain compounds originating from industrial combustion;
- the analysis of molecular or atomic phenomena, terahertz spectroscopy enabling to obtain new information relative to mechanisms such as photo-excitation, photo-dissociation, and solvation. The same is true for the analysis of molecular interactions (vibratory states of molecules or of hydrogen bonds, for example), of condensed phase systems, of dynamic processes in large molecules such as peptides and proteins, or also the observation of the orientation of polymers with a technique based on terahertz radiation;
- the study of the properties of materials such as semiconductors, to non-destructively determine, for example, their mobility, the dynamics of ultra-fast carriers, and carrier-phonon interactions, supraconductors, polymers, ceramics, organic materials, and porous materials. Further, in the terahertz range, materials such as plastics, paper and textiles are transparent, metals are perfect reflectors, and water has a high absorbing power. Thus, the detection in this range is particularly adapted to the inspection of packaged products or to the real-time in situ control of manufacturing processes, for example; and
- wide-band communication, the race for always higher data speeds, at a terrestrial level as well as between satellites, inducing the development of systems operating at frequencies which now reach several hundreds of gigahertz, and soon several terahertz.

BACKGROUND

A resistive bolometric detector usually measures the power of an incident radiation in the infrared range. For this purpose, it comprises an absorbing resistive bolometric element which converts the light flow into a heat flow, which causes a temperature rise of said element with respect to a reference temperature. Such a temperature increase then induces a variation of the electric resistance of the absorbing element, causing voltage or current variations thereacross. Such electric variations form the signal delivered by the sensor.

However, the temperature of the bolometric element usually largely depends on its environment, and especially on the temperature of the substrate which comprises the electronic read circuit. To desensitize as much as possible the absorbing element from its environment, and thus to increase the detector sensitivity, the bolometric element is generally thermally insulated from the substrate.

Figure 1:
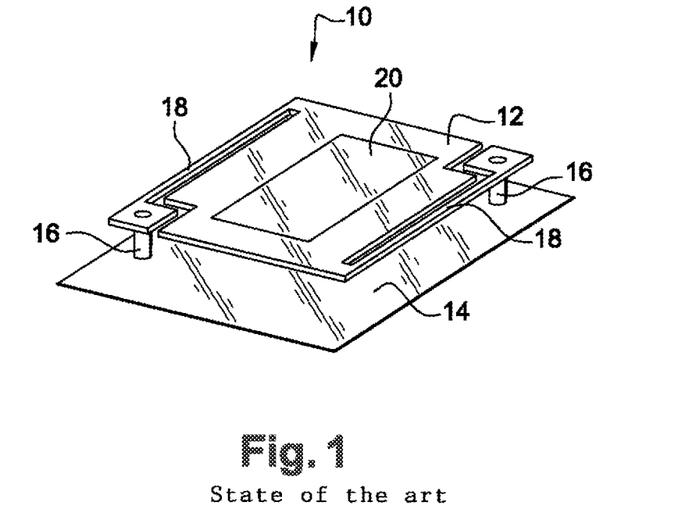
FIG. 1 is a simplified perspective view of an elementary bolometric detector of the state of the art, already described hereabove.

FIG. 1 is a simplified perspective view of an elementary state-of-the-art resistive bolometric detector 10 for infrared detection illustrating this thermal insulation principle. Such an elementary detector, usually called "bolometer", here in the form of a suspended membrane, is conventionally part of a one- or two-dimensional array of elementary detectors.

Bolometer 10 comprises a thin membrane 12 absorbing the incident radiation, suspended above a substrate-support 14 via two conductive anchoring nails 16 to which it is fixed by two thermal insulation arms 18. Membrane 12 usually comprises an electric insulator layer, such as for example $SiO_2$, SiO, SiN, ZnS or other, which ensures the mechanical stiffness of membrane 12, as well as a metallic electric interconnection layer deposited on the insulating layer.

A thin layer 20 of resistive theylometric material is further deposited at the center of membrane 12 on the metal interconnection layer, especially a layer of semiconductor material, such as polysilicon or amorphous silicon of p or n type, lightly or strongly resistive, or a vanadium oxide ($V_2O_5$, $VO_2$) elaborated in a semiconductor phase.

Finally, the substrate-support 14 comprises an electronic circuit integrated on a silicon wafer, usually known as "read circuit". The read circuit comprises, on the one hand, the elements for stimulating and reading the thermometric element 20 and, on the other hand, the multiplexing components which enable to serialize the signals originating from the different thermometric elements present in the array detector.

In operation, membrane 12 heats up under the effect of an incident electromagnetic radiation and the generated heat power is transmitted to thermometric material layer 20. Periodically, the read circuit arranged in substrate 14 biases membrane 12 by submitting nails 16 to a bias voltage and collects the current flowing through thermometric element 20 to deduce a variation of its resistance, and thus the incident radiation having caused said variation.

The structure and the operation of such a detector being conventional, they will not be explained in further detail, for the sake of brevity. It should however be noted that membrane 12 performs, in additional to the thermal insulation function, three main functions: an antenna function to receive the radiation, a function of conversion of the received electromagnetic power into heat power, and a function of thermometric measurement of the generated heat power. As it is used as an antenna, the dimensions of membrane 12 are accordingly selected to be of the same order of magnitude as the wavelength of the radiation intended to be measured.

Now, in the terahertz range, wavelengths may reach one millimeter, which thus requires a membrane of the same order of magnitude. However, for such dimensions, the thermal mass, the mechanical hold, and the radiative losses of the membrane are such a problem that they eventually adversely affect the detector efficiency.

Thereby, for such a frequency range, the radiation receive function is decoupled from the other functions. The receive function is thus performed by a planar antenna, and the function of converting the electromagnetic power into thermal power is ensured by the resistive load of the antenna. The dimensions of the resistive load conventionally meet the impedance matching conditions, which depend on the geometry of the antenna and on the nature of the layers supporting it, to obtain an optimal conversion. The resistive load is further in thermal contact with a thermometric component for the measurement of the generated thermal power. The assembly then forms a bolometer with an antenna.

In such a configuration, the then lometric element is independent from the antenna and its size no longer depends on the incident wavelength, but rather on factors determining the intrinsic performances of the detector (sensitivity, signal-to-noise ratio, etc.), in accordance with the requirements of the targeted application, for example, active imaging or passive imaging.

Further, in most cases, the incident electromagnetic radiation is not polarized, so that its reception by a single antenna does not enable to capture all of the electromagnetic power. However, a non-polarized radiation may be considered as the superposition of two components linearly polarized in two orthogonal directions, each of these components transporting half of the wave energy. As known per se, an efficient way to capture an incident electromagnetic radiation is to use two crossed bowtie antennas. Bowtie antennas are discussed, for example, in R. PEREZ's thesis, "*Contribution à l'analyse théorique et experimentale de radargrwnines GPR:performances des antennes:apports d'une configuration multistatique*", doctoral thesis, Université de Limoges, 2005, which can be consulted on the following site: http://www.unilim.fr/theses/2005/sciences/2005limo0053/perez_r.pdf.

Document U.S. Pat. No. 6,329,655 describes a bolometer with antenna 30, operating in the millimeter range and provided with two crossed bowtie antennas 32, 34, shown in simplified top and cross-section view in FIGS. 2 and 3, respectively.

Figure 3:
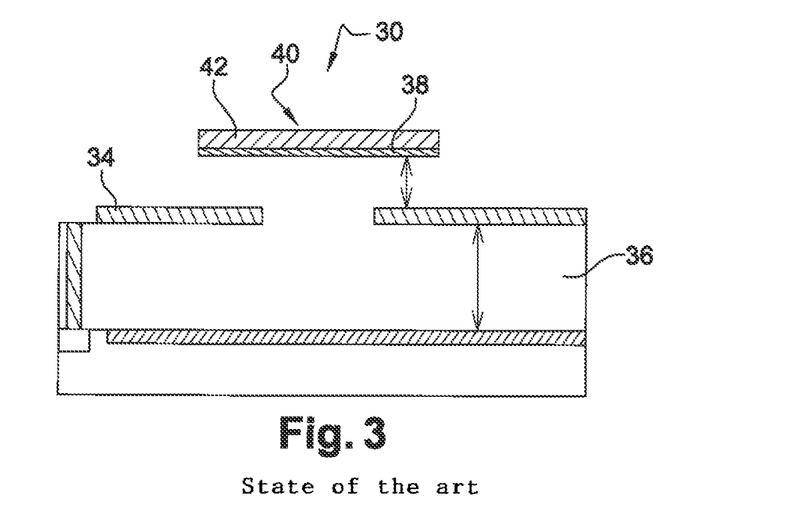

The principle of bolometer 30 relies on the capacitive coupling performed between antennas 32, 34, arranged on a substrate-support 36, and a resistive load 38, arranged in a suspended membrane 40 and having a thermometric element 42 deposited thereon (FIG. 3).

Figure 2:
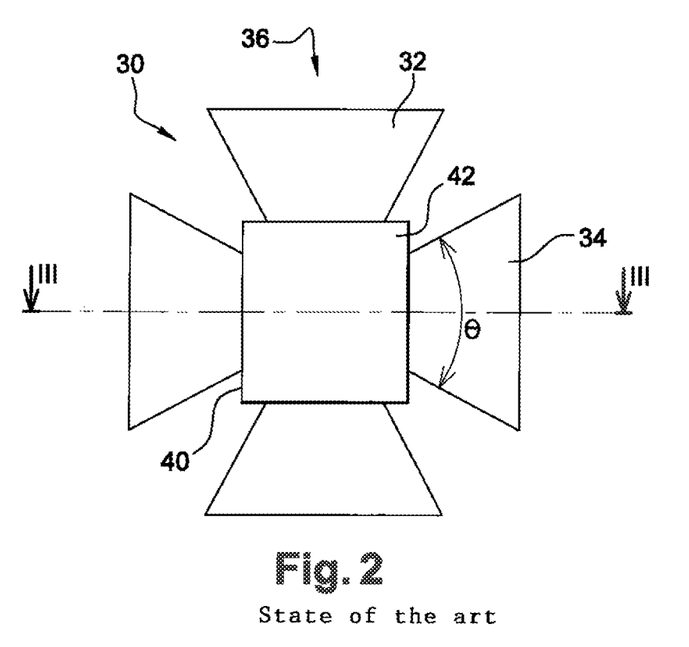
FIGS. 2 and 3 are simplified top and cross-section views of a bolometric detector with antennas according to the state of the art, already described hereabove.

Resistive load 38, which takes the form of a square layer arranged at the center of antennas 32, 34, indeed has a surface opposite thereto and thus forms a capacitance with the antennas. The radiation detected by antennas 32, 34 is thus transmitted to load 38 by capacitive coupling.

Under the effect of the transmitted radiation, load 38 heats up and transmits the heat thus generated to thermometric element 42, which in turn heats up and sees its electric resistance modified.

While the fact of suspending the thermometric element above the substrate enables it to undergo an electric resistance variation under the effect of the incident radiation, such a variation however remains minute. Indeed, in the context of the elementary bolometric detector of FIG. 1, at 300° K, a variation by 1 K of the observed scene induces a relative variation of the electric resistance of thermometric layer 20 by approximately 0.04%. Indeed, most of the value of the electric resistance of this element is mainly dictated by the direct environment of the membrane. Especially, the substrate influences the temperature of membrane 12 via the thermal conduction through nails 16 and arms 18, which set approximately 70% of the value of the electric resistance of layer 20. Further, the elements surrounding the membrane, such as the substrate and the package of the detector, also emit a thermal radiation, which sets approximately 20% of the value of the electric resistance of layer 20 for an ambient temperature of 300° K. In the best case, less than 10% of the value of the electric resistance, and more generally less than 1% thereof, are set by the incident radiation. The most part of the electric resistance of thermometric material layer 20 being set by elements unrelated to the observed scene, in the absence of specific measure, the detector read dynamics is thus very limited, which makes such a detector very difficult to use.

To overcome this problem, the elementary bolometric detector is associated with a compensation or skimming structure, aiming at removing the non-useful part of the signal originating from the reading of the thermometric element of the membrane.

Figure 4:
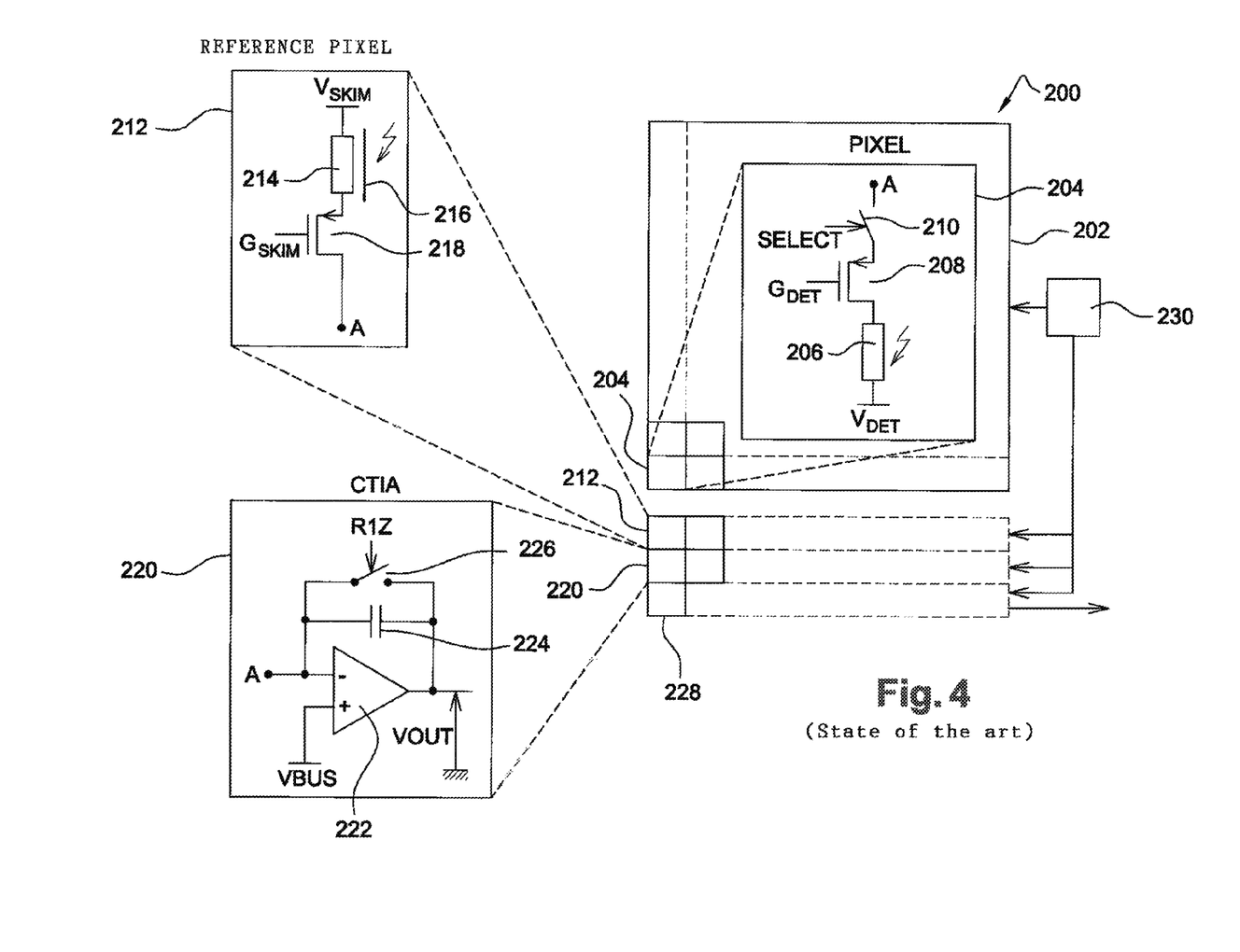
FIG. 4 is an electric diagram of an infrared bolometric detector of the state of the art, already described hereabove.

FIG. 4 is an electric diagram of an infrared bolometric detector 200 of the state of the art comprising such a skimming structure. Detector 200 comprises a two-dimensional array 202 of unit detection elements 204, or "pixels", each comprising a sensitive bolometer 206 in the form of a membrane suspended above a substrate, for example, the bolometer illustrated in FIG. 1, connected at one of its terminals to a constant voltage "$V_{DET}$" and at the other to a MOS biasing transistor 208 setting the voltage across bolometer 206 by means of a gate control voltage "$G_{DET}$". Pixel 204 also comprises a selection switch 210, connected between MOS transistor 208 and a node "A" provided for each column of array 202, and driven by a control sitmal "SELECT", enabling to select bolometer 206 for the reading thereof. The two-dimensional assembly of suspended membranes, usually called "retina", is placed in a tight package in line with a window transparent to the infrared radiation to be detected and in the focal plane of an optical system (not shown). Transistor 208 and switch 210 are usually formed in the substrate under the influence of the membrane of bolometer 206.

Detector 200 also comprises, at the foot of each column of array 202, a skimming structure 212 comprising a reference bolometer 214 identical to bolometers 206 of pixels 204 from an electrothermal viewpoint and made insensitive to the incident radiation originating from the scene to be observed. Reference bolometer 214 for example comprises a suspended membrane identical to that of sensitive bolometers 206 of array 202, made insensitive to the radiation to be detected by means of a screen 216, in which case the electric resistance of the thermometric element of reference bolometer 214 differs from that of sensitive bolometers 206 by the electric resistance variation that the latter undergo due to the incident radiation. This type of structure, optimal from the common mode viewpoint, is however difficult and expensive to manufacture. As a variation, bolometer 214 comprises a stack identical to the stack forming the suspended portion of the membrane of bolometers 206, and thus the suspended membrane of bolometers 206, without the thermal insulation system essentially comprising thermal insulation arms 18, directly formed on top and/or inside of the substrate. In this case, the electric resistance of bolometer 214 is essentially dictated by the substrate temperature, bolometer 214 being said to be "thermalized" to the substrate. Bolometer 214 is connected at one of its terminals to a constant voltage "$V_{SKIM}$", and skimming structure 212 further comprises a biasing MOS transistor 218 setting the voltage across bolometer 214 by means of a gate control voltage "$G_{SKIM}$" and connected between the other terminal of bolometer 214 and node "A".

Detector 200 also comprises, at the foot of each column of array 202, an integrator 220 of CTIA type ("capacitive transimpeclance amplifier") for example comprising an amplifier 222 and a capacitance 224 connected between the inverting input and the output of amplifier 222. The inverting terminal and the non-inverting terminal thereof are further respectively connected to node "A" and to a constant voltage "VBUS". A switch 226, driven by a signal "RAZ", is also provided in parallel with capacitance 224, for the discharge thereof. The outputs of CTIAs 220 are eventually, for example, connected to respective sample-and-hold devices 228 for the delivery of voltages "Vout" of the CTIAs in multiplexed mode.

Figure 5:
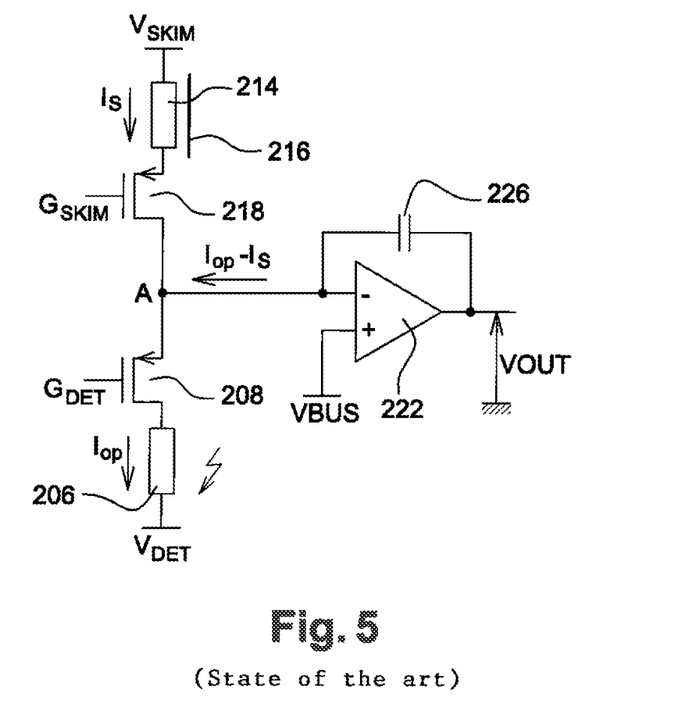
FIG. 5 is an electric diagram illustrating the reading of a sensitive bolometer of the detector of FIG. 4 by means of a skimming structure.

Finally, detector 200 comprises a management unit 230 controlling the different previously-described switches. In operation, array 202 is read line by line. To read a line of array 202, switches 210 of the line of pixels 204 are turned on and switches 210 of the other lines are turned off. After a phase of discharge of the CTIA capacitors at the foot of the columns, achieved by the turning-on of switches 226 followed by their turning-off, a circuit such as shown in FIG. 5 is thus obtained for each pixel of the line being read. A current "Iop" flows in bolometer 206 of the pixel under the effect of its voltage biasing by MOS transistor 208, and a current "Is" flows in bolometer 216 of the skimming structure under the effect of its voltage biasing by MOS transistor 218. The resulting current difference is integrated by CTIA 220 during a predetermined integration period "Tint". Output voltage "Vout" of CTIA 220 thus is a measurement of the variation of the resistance of bolometer 206 caused by the incident radiation to be detected since the non-useful part of current "Iop" is at least partly compensated for by current "Is" specifically generated to reproduce this non-useful part.

While the skimming structure just described provides satisfactory results in infrared detection, its application to terahertz detection is not satisfactory.

As previously described, the reference bolometers of the skimming structures of infrared detectors of the state of the art are necessarily desensitized to the infrared radiation originating from the scene. Indeed, only the non-useful part of the currents flowing through the sensitive bolometers is to be reproduced, and thus the useful part of said currents, which correspond, in this application, to the infrared radiation to be detected are not to be compensated for.

However, in the context of a terahertz detection, infrared radiation becomes a disturbing element having a non-negligible influence due to its high intensity, infrared radiation most often having an intensity greater by several orders of magnitude than the intensity of terahertz radiation. It is thus necessary to "process" the infrared radiation to detect the terahertz radiation.

However, if a skimming structure similar to that of an infrared detector, that is, desensitized to the radiation originating from the scene, is provided in a terahertz detector, the skimming structure is also desensitized to infrared radiation, so that it does not reproduce the non-useful part corresponding to this radiation. Since it is not reproduced, this non-useful part is thus not compensated for in the current flowing through the sensitive bolometers. Now, as previously described, infrared radiation being greater by several orders of magnitude than terahertz radiation, the useful part of the current of the sensitive bolometers corresponding thereto is thus "drowned" in the non-useful part of the current corresponding to infrared radiation. The detector thus obtained thus finally has a very low sensitivity to terahertz radiation.

Further, a skimming structure which is not desensitized to the radiation originating from the scene cannot be envisaged, since such a structure would reproduce the useful part corresponding to terahertz radiation, which useful part would be compensated for in the current of the sensitive bolometers.

SUMMARY OF THE INVENTION

The present invention aims at providing, in a terahertz bolometric detector, a circuit which efficiently compensates for the non-useful part of the signals generated by sensitive bolometers of the detector, including the non-useful part of these signals corresponding to the infrared radiation originating from the observed scene.

For this purpose, the invention aims at a device for detecting an electromagnetic radiation in the terahertz range, comprising at least one elementary bolometric detector, comprising:
  at least one antenna for collecting the terahertz electromagnetic radiation;
  a microbridge suspended above a substrate by electrically-conductive support and thermal insulation arms, the microbridge comprising:
    a resistive load coupled to the antenna to convert the electromagnetic power that it collects into thermal power; and
    a resistive bolometric element coupled to the resistive load to heat up under the effect of the thermal power that it generates;
  and a bias circuit electrically connected to the bolometric element via the support and thermal insulation arms to electrically bias it and generate an electric signal depending on the electric resistance of said element.

According to the invention, the detection device further comprises:
  a skimming circuit comprising:
    a microbridge suspended above the substrate by electrically-conductive support and thermal insulation arms, and comprising a resistive bolometric element, the microbridge of the skimming circuit being substantially identical to the microbridge of the elementary bolometric detector in terms of electric resistance, of thermal time constant, and of infrared detection;
    a reflective metal layer formed on the substrate opposite to the microbridge, the distance separating the microbridge from the reflective layer being selected to obtain a destructive interference at the level of the microbridge for a wavelength of the terahertz radiation; and
    a bias circuit electrically connected to the microbridge of the skimming circuit to electrically bias it and generate an electric signal depending on the electric resistance of said element; and
  a read circuit capable of being coupled to the elementary detector and to the skimming circuit to measure a difference between the electric signals that they generate.

In other words, the terahertz detector according to the invention comprises a skimming structure associated with each elementary bolometric detector and comprising a reference bolometer in the form of a microbridge designed to be submitted at least to the thermal influence of the substrate by the same proportions as the sensitive bolometer of the elementary detector, and to render this influence in the form of a common-mode signal subtracted from the signal generated by the elementary bolometric detector, for example, a common-mode current in the context of a voltage biasing.

Then, the reference bolometer is designed to be sensitive to the incident infrared radiation to reproduce the non-useful part corresponding to said radiation. For example, the reference bolometer comprises a microbridge having a suspended portion identical to that of the microbridge of the elementary bolometric detector and the reference bolometer comprises no screen for blocking the incident radiation.

However, the reference bolometer is made insensitive to the terahertz radiation to be detected by forming a destructive interference fringe centered on the microbridge or in the vicinity thereof for the terahertz radiation. It is indeed known that the reflection on a metal layer induces a −180° phase shift between the incident radiation and the reflected radiation, and thus the generation of interference fringes. By selecting the appropriate distance between the microbridge and the reflective layer to place the microbridge in a destructive fringe, the absorption of the terahertz radiation by the microbridge of the reference bolometer is thus substantially minimized. Since the terahertz radiation to be detected is not or very slightly absorbed by the reference bolometer, the useful part of the signal generated by the elementary detector thus remains substantially unchanged after subtraction of the signal originating from the skimming structure, conversely to the non-useful part corresponding to infrared radiation.

According to an embodiment, the skimming circuit is arranged so that the corresponding microbridge receives at least part of the incident radiation on the microbridge of the elementary bolometric detector.

According to an embodiment, the microbridge of the skimming circuit has a structure identical to that of the microbridge of the elementary bolometric detector, which enables to generate a common-mode signal as close as possible to that of the sensitive bolometer.

According to an embodiment, the microbridge of the skimming circuit has a structure which differs from that of the microbridge of the elementary bolometric detector only in that the microbridge of the skimming circuit comprises no resistive load. As a variation, the microbridge of the skimming circuit has a structure which differs from that of the microbridge of the elementary bolometric detector only in that the microbridge of the skimming circuit comprises a resistive load assembled in short-circuit.

Although the absence or the shorting of resistive loads modify the electrothermal properties of the reference bolometer with respect to those of the sensitive bolometer, such modifications are however usually less significant than the dispersions of electrothermal properties induced by the uncertainties of the manufacturing technology. However, the absence or the shorting of resistive loads enables to reject possible resonances resulting from a patch antenna behavior. A patch structure is for example formed by the empty space between the metal surface of the antennas and the reflective plane. This structure has its own resonance modes at frequencies located outside of the bolometer detection range. However, the currents induced by these resonances are capable of dissipating energy in the resistive loads of the antennas, thus taking part in the heating of the bolometric bridge. Such absorption phenomena specific to the skimming bolometer may thus degrade its reference function. It is thus advantageous to prevent these effects by suppressing or by shorting these loads.

According to an embodiment, the distance separating the microbridge of the skimming circuit from the reflective layer is lower than one tenth of the wavelength of the terahertz radiation. Thereby, the microbridge is arranged in the first destructive interference fringe.

For example, the bolometer sensitive to terahertz radiation is that described in relation with FIGS. 2 and 3 and the skimming structure comprises a microbridge identical to membrane 40 suspended above a metal layer deposited on substrate 36 at a distance shorter than 10 micrometers and with no specific protection against incident radiation.

According to an embodiment, the elementary bolometric detector comprises a first and a second crossed bowtie antennas, intended to collect the electromagnetic radiation, the first antenna is arranged outside of the microbridge and is capacitively coupled with the resistive load, and
the second antenna is arranged in the microbridge in resistive coupling with the resistive load.

Thereby, the antennas are separated from each other by the empty space between the microbridge and the substrate, so that there is a low coupling between them, especially via a material.

To obtain electrothermal properties as close as possible to those of the sensitive bolometer, the reference bolometer thus comprises a microbridge which comprises the second antenna, and thus an antenna sensitive to terahertz radiation. The fact of placing the microbridge, and thus the second antenna, in a destructive interference fringe thus enables to efficiently "neutralize" the terahertz detection of said antenna.

Advantageously, the resistive load of the microbridge of the elementary bolometric detector comprises a metal film, and the microbridge of the elementary bolometric detector comprises fins arranged opposite to the first antenna on the metal film to be in capacitive coupling therewith and thus to achieve an impedance matching between the first antenna and the metal film. Preferably, the fins take a shape similar to the central portions of the first antenna. In particular, the fins are covered with an electric insulator and the bolometric element is at least partially arranged on said insulator and at least partially in contact with the metal film. In other words, the fins are designed in terms of dimension, shape, and material to perform an optimal impedance matching with the first antenna and this, independently from the second antenna. It should be noted that the destructive interference occurring at the microbridge level enables to further "neutralize" the terahertz detection possibly performed by the fins.

Advantageously, the resistive load of the microbridge of the elementary bolometric detector comprises a metal film, and the second antenna is at least partially arranged on this metal film. In other words, the resistive film here performs the conversion function for the electromagnetic power received by the second antenna and this, independently from the fins and from the first antenna.

Advantageously, the first antenna is arranged on the substrate.

Advantageously, the device comprises a one- or two-dimensional array of elementary bolometric detectors, and a skimming circuit associated with each column of said array.

Advantageously, the reflective metal layer has a surface area greater than or equal to the projected surface area of the microbridge of the skimming circuit.

BRIEF DESCRIPTION OF THE DRAWINGS

The present invention will be better understood on reading of the following description provided as an example only in relation with the accompanying drawings, where the same reference numerals designate the same or similar elements, among which.

DETAILED DESCRIPTION

A terahertz bolometric detector according to the invention will now be described. Such a detector is intended to detect a terahertz radiation within the frequency range between 100 gigahertz and 10 terahertz and originating from an observed scene.

The detector according to the invention comprises an array of sensitive bolometers detecting the incident radiation and skimming structures compensating for a non-useful part of the signals generated by the sensitive bolometers. For example, the detector according to the invention has an electric architecture identical to that described in relation with FIGS. 4 and 5, the detector according to the invention differing from infrared bolometric detector 200 in FIGS. 4 and 5 by the structure of the sensitive bolometers and the structure of the reference bolometers.

Figure 6:
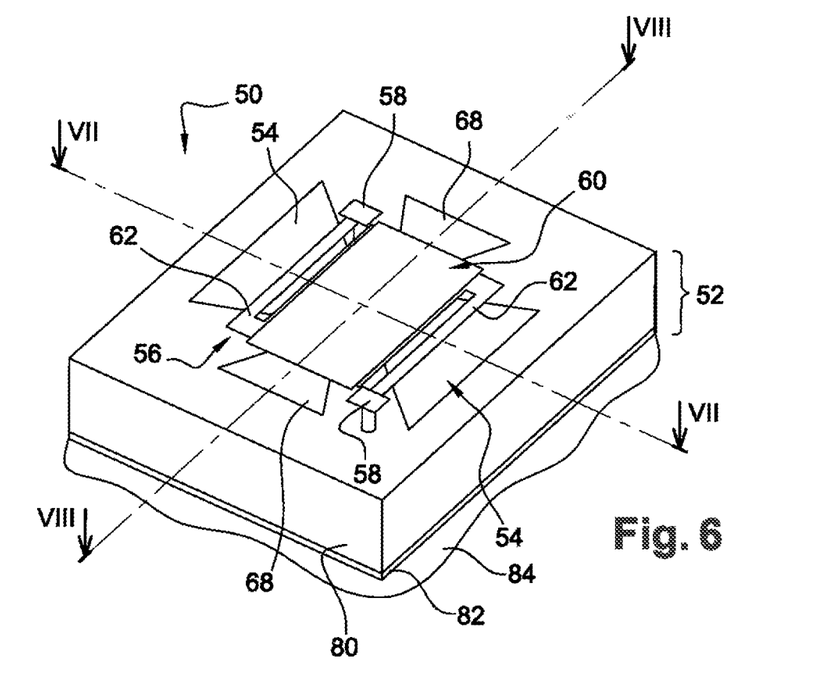
FIG. 6 is a simplified perspective view of a sensitive terahertz bolometer comprised in the structure of a detector according to the invention.
Figure 7:
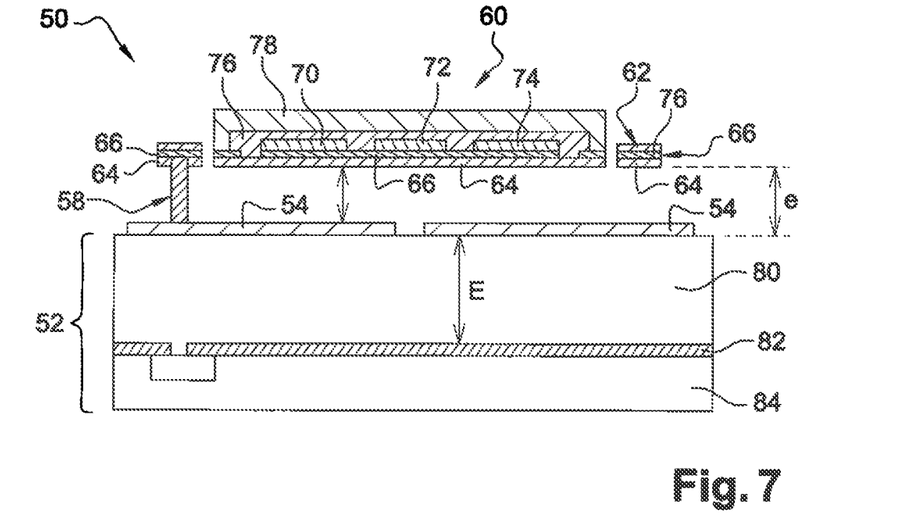
FIGS. 7 and 8 are cross-section views of the sensitive bolometer of FIG. 6, respectively along planes VII-VII and VIII-VIII of FIG. 6.
Figure 8:
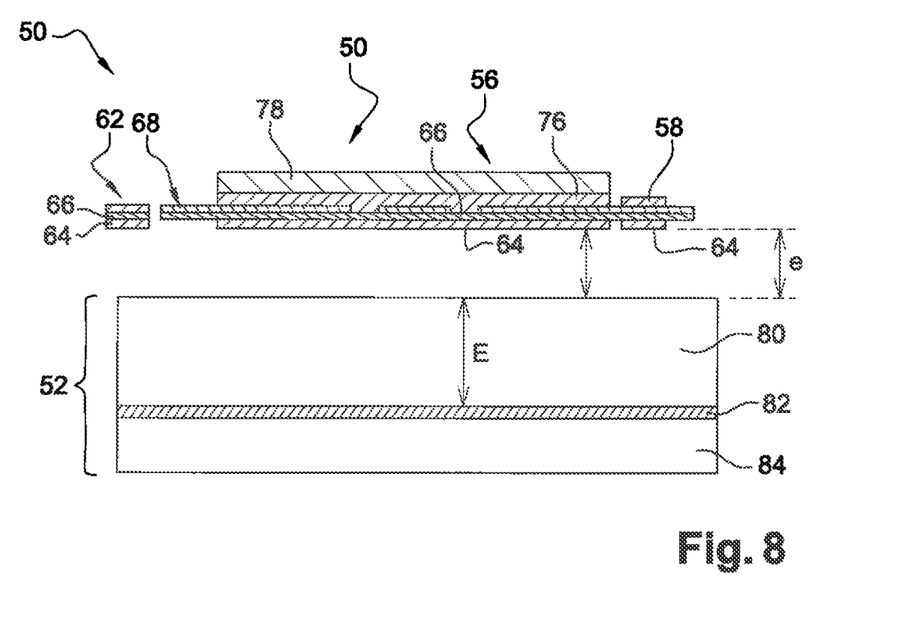

Especially, the terahertz bolometric detector according to the invention comprises sensitive bolometers designed to detect the terahertz radiation such as illustrated in FIGS. 6 to 8.

In FIG. 6, a bolometer sensitive in the terahertz range 50 comprises an insulating substrate 52 having a first planar bowtie antenna 54 deposited thereon, made of a conductive material, as well as a microbridge 56, suspended above substrate 52 by two conductive anchoring nails 58.

Microbridge 56 is formed of a central portion 60 and of two thermal insulation arms 62 connecting central portion 60 to anchoring nails 58 and perpendicular to the main axis (V-V) of first antenna 54.

Microbridge 56 comprises a first electric insulator layer 64, as well as a conductive layer 66 deposited on insulator layer 64, and more specifically a metal film, for example, made of Ti, TiN, Pt, NiCr or others. Insulator layer 64 and thin film 66 each have a thickness ranging between 0.005 and 0.05 micrometers. Preferably, the resistance per square of metal film 66 ranges between 100 Ω/square and 500 Ω/square and is selected so that aims 62 have optimal electric and thermal resistances.

A second bowtie antenna 68 made of a conductive material, crossed with first antenna 54 and having a main axis (VI-VI) parallel to thermal insulation arms 62, is further formed on conductive layer 66 of microbridge 56, and extends on either side of central portion 60. Second bowtie antenna 68 is thus resistively coupled to conductive layer 66. Antennas 54 and 68 are made of a conductive material such as aluminum, tungsten silicide, titanium, or other, having a thickness for example ranging between 0.1 and 0.5 micrometer.

Fins 70, 72, 74, made of the same material as antennas 54, 68 and having a thickness ranging between 0.1 and 0.5 micrometer, are also provided on conductive layer 66 with surfaces opposite to first bowtie antenna 54. Fins 70, 72, 74 are thus capacitively coupled with antenna 54, and are further selected to perform an impedance matching therewith in a way which will be explained in detail hereinafter.

More specifically, distance e separating antennas 54 and microbridge 56 ranges between 0.5 and 5 micrometers and is preferably equal to 2 micrometers for mechanical hold reasons. Distance e is selected to perform a high-performance capacitive coupling between first antenna 54 deposited on substrate 52 and fins 70, 72, 74. This thickness is preferably selected to be as low as possible, while being compatible with the mechanical hold of microbridge 56 to provide the thermal insulation.

Fins 70, 72, 74, as well as the portion of second bowtie antenna 68 arranged in central portion 60, are covered with an insulator layer 76 to electrically insulate them, a portion of conductive layer 66 being left exposed. Layer 76 is for example formed of a layer of SiN, SiO, ZnS, or other, of a thickness ranging between 0.005 and 0.1 micrometer.

A layer of thermometric material 78 is further deposited on insulator layer 76 in contact with conductive layer 66 at the level of the portion thereof left exposed by insulator layer 76. The material forming thermometric element 78 for example is an amorphous or polycrystal semiconductor such as Si, Ge, SiC, a-Si:H, a-SiGe:H, a metallic material, or also a vanadium oxide or a magnetite oxide. This material should have a non-zero temperature coefficient resistance (TCR). In other words, it has a resistance which varies according to temperature.

Finally, substrate 52 comprises an insulating layer 80, having a low absorption coefficient in the operating wavelength range of the detector, and a reflector 82, layer 80 and reflector 82 forming a resonant cavity for antennas 54, 68 in the frequency range of interest. A functional layer 84 comprising the read circuits of the detector is eventually provided under reflector 82.

Cavity 80, 82 of the detector is formed of a reflector 82, arranged on read circuit 84, such as for example an aluminum layer, and of a layer 80 of insulating material, having the lowest possible absorption coefficient in the detector operating wavelength range. For example, layer 80 is made of SiO, $SiO_2$, SiN, $Ta_2O_5$, $Ta_2O_5$—$TiO_2$, $HfO_2$, $SrTiO_3$, $Ba_{1-x}Sr_x$-$TiO_3$ or of a mixture thereof.

Especially, layer 80 has a thickness $\underline{E}$ ranging from 10 to 500 micrometers, set to value:

$$E\lambda/(4n)$$

where:
  λ is a wavelength of the detector operating range, for example, the central wavelength of this range; and
  n=$\sqrt{\in}$, ∈ being the dielectric permittivity of the material forming layer 80.

A resonant cavity is thus obtained for the terahertz radiation to be detected.

Layer 80 is further crossed by electric connections, for example, in continuation of anchoring nails 58, to electrically connect read circuit 84 and thermometric element 78. For example, the connections are made of a metal such as tungsten, aluminum, or copper.

Figure 9:
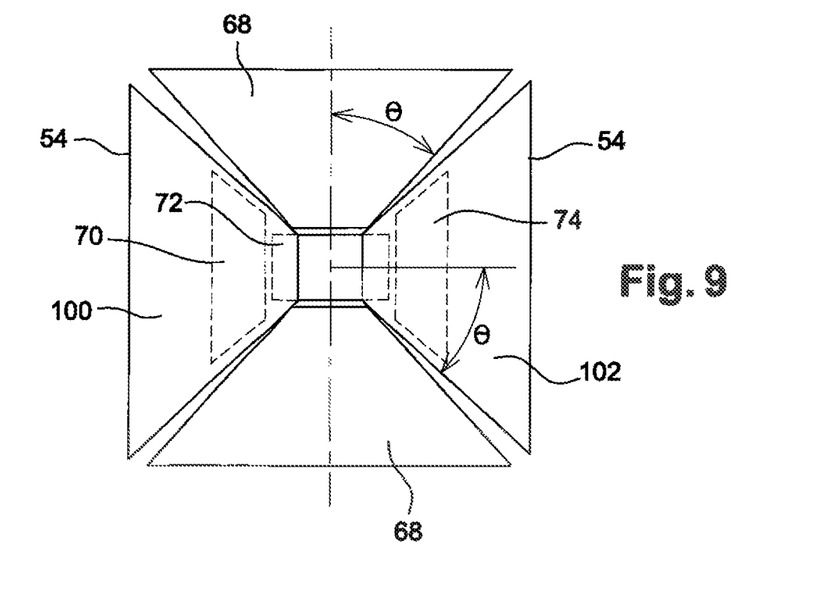
FIG. 9 is a simplified top view illustrating the impedance matching fins comprised in the structure of the sensitive bolometer of FIG. 6.

FIG. 9 schematically illustrates in top view first and second bowtie antennas 54, 68, as well as fins 70, 72, 74. As can be seen, a first central fin 72, of rectangular shape, is astride two wings 100, 102 of the bowtie antenna 54, and two lateral fins 70, 74 are respectively located opposite to portions 100, 102 of first antenna 54. Preferably, lateral fins 70, 74 substantially have a shape and a size identical to a portion of antenna 54. The fins have a trapezoidal shape equivalent to the trapezoidal shape of the opposite antenna.

Its surface area advantageously corresponds to capacitance C necessary for the impedance matching. An optimal impedance matching is thus obtained.

Further, the resistive load of the antennas, defined by the portions of conductive layer 66 located between fins 70, 72, 74 and between the portions of second antenna 68, has a decreased surface area. This surface are being decreased, the coupling of the detector according to the invention with the infrared radiation, which is, as a first approximation, proportional to the size of the resistive load, is thus also decreased.

Further, the length of antennas 54, 68 and of the fins, as well as their angle of opening θ, is selected to increase or to decrease the detector bandwidth.

A reference bolometer of a skimming structure according to the invention adapted to the sensitive bolometer just described will now be described.

As previously described, the reference bolometer has the function of:
a) substantially undergoing the same disturbances as the sensitive bolometer, and especially the influence of the temperature of surrounding elements, in particular the substrate, as well as the influence of incident radiations other than the radiation to be detected, in particular infrared radiation,
b) behaving substantially identically from a thermal viewpoint, or at least very similarly, to the sensitive bolometer when confronted to such disturbances; and
c) rendering such disturbances substantially in the same way from an electric viewpoint, or at least very similarly, as the sensitive bolometer.

Figure 10:
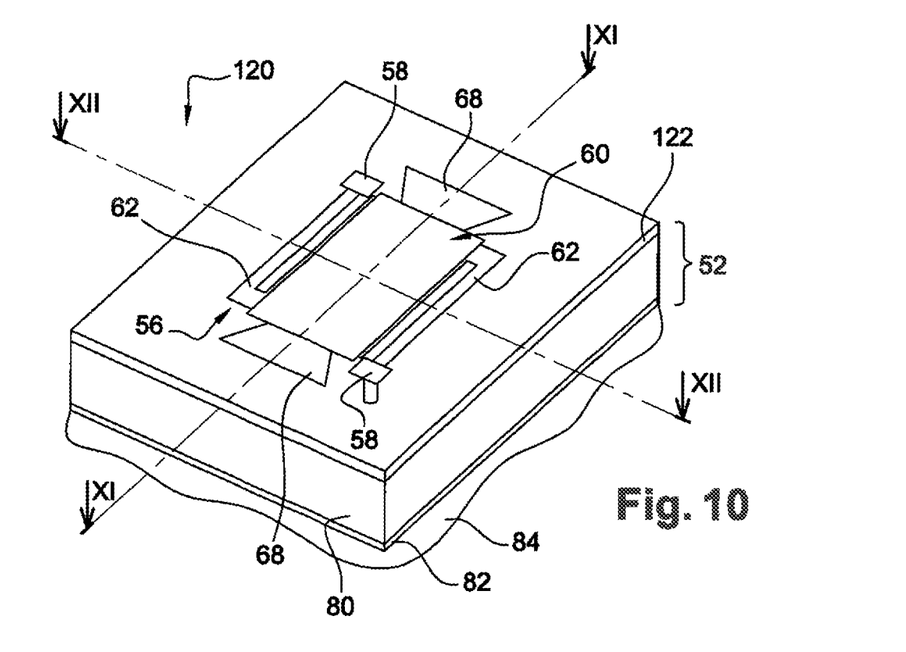
FIG. 10 is a simplified perspective view of a reference bolometer comprised in a skimming structure according to the invention.
Figure 11:
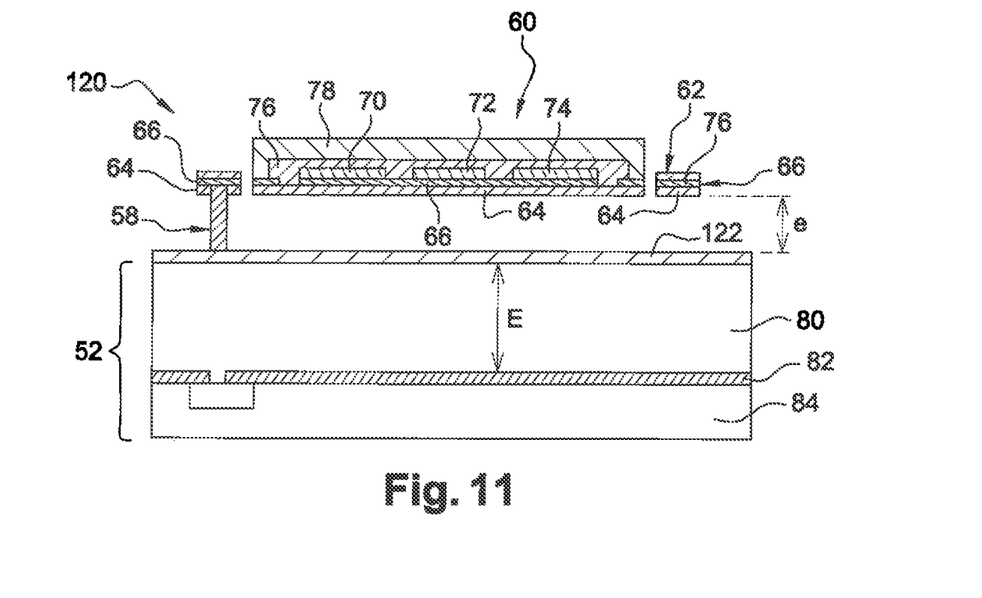
FIGS. 11 and 12 are cross-section views of the reference bolometer of FIG. 10, respectively along planes XI-XI and XII-XII of FIG. 10.
Figure 12:
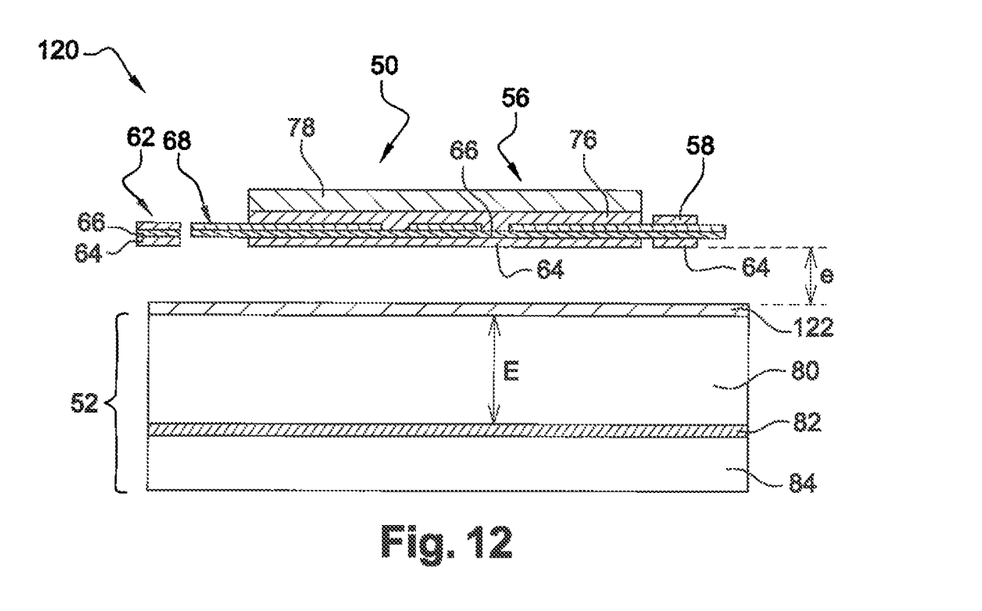

For this purpose, in a first embodiment illustrated in FIGS. 10 to 12, a reference bolometer 120 according to the invention is identical to sensitive bolometer 50 illustrated in FIGS. 6 to 8, but for the fact that:
first antenna 54 of sensitive bolometer 50 is replaced with a layer 122 reflecting with a 180° phase shift the radiation incident on microbridge 56 and crossing it, advantageously a metal layer, deposited on insulating substrate 52 under and around microbridge 56. Advantageously, the layer is made of the same material as antenna 54 and has a thickness preferably identical to that of antenna 54 of the sensitive bolometer. The dimensions of metal layer 122 are selected to be at least equal to the projected surface area of microbridge 56;
distance e between metal layer 122 and microbridge 56 which places microbridge 56 of reference bolometer 120 in a destructive interference fringe between the radiation incident on layer 122 and the radiation reflected with a phase shift by said layer for a wavelength of the terahertz range to be detected. As previously described, distance e between microbridge 56 of sensitive bolometer 50 and first antenna 54 is advantageously selected to be as low as possible to have an optimal capacitive coupling between antenna 54 and fins 70, 72, 74, while also allowing a thermal insulation from substrate 52. For example, distance e for sensitive bolometer 50 ranges between 0.5 and 5 micrometers. These values being much lower than the terahertz wavelength, which is greater than on tenth of a millimeter, distance e of reference bolometer 120 is advantageously equal to distance e of sensitive bolometer 50, microbridge 56 of the reference bolometer being thus located in a destructive interference range. Thereby, reference bolometer 120 only differs from sensitive bolometer 50 by reflective layer 122, and can thus be manufactured jointly with sensitive bolometer 50 by using the same manufacturing steps.

Figure 13:
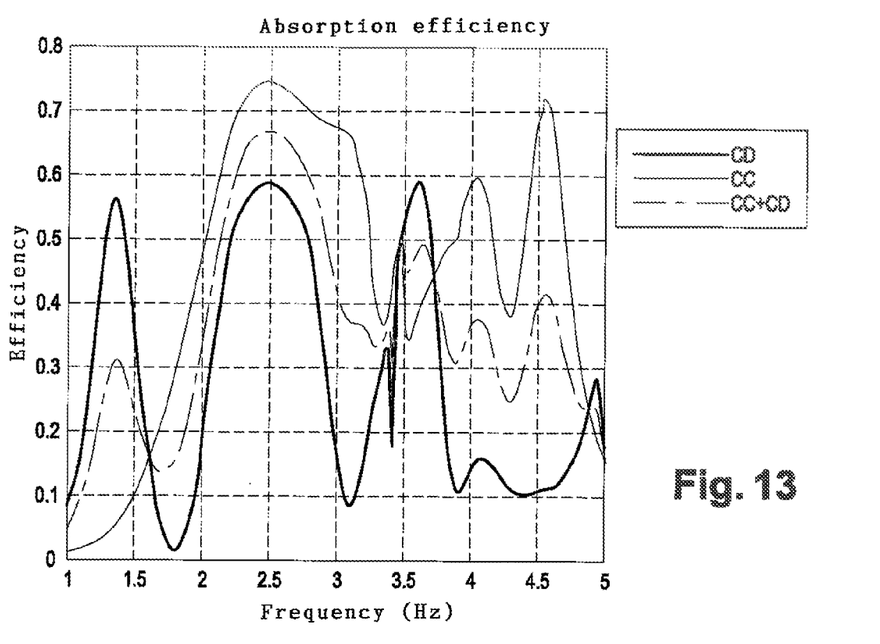
FIGS. 13 and 14 respectively are curves of the absorption efficiency of the sensitive bolometer of FIGS. 6 to 8 and of the reference bolometer of FIGS. 10 to 12.
Figure 14:
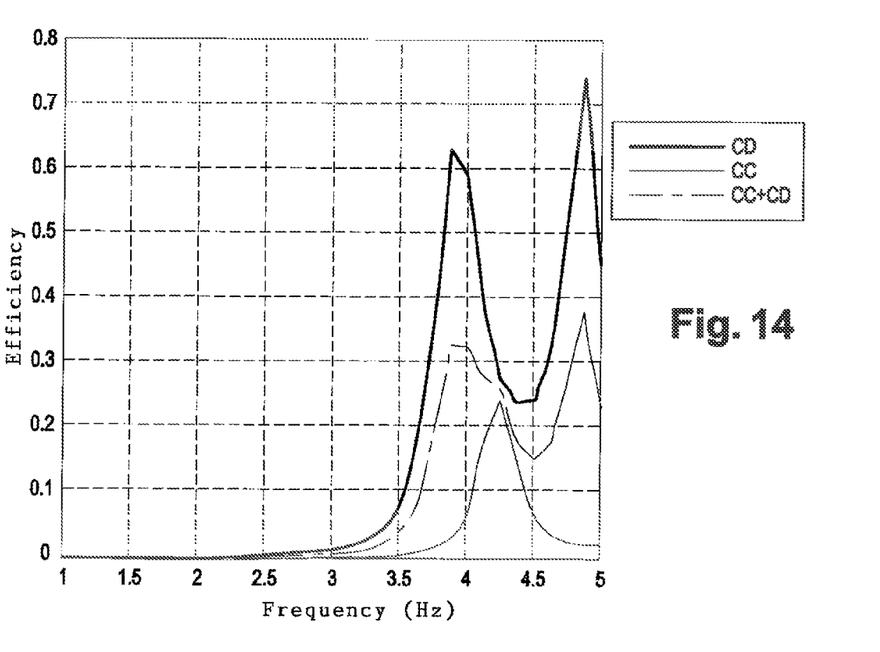

FIGS. 13 and 14 respectively show the absorption efficiency of an active sensitive bolometer 50 designed to optimally operate between 2 THz and 3 THz and the absorption efficiency of a reference bolometer 120 such as previously described Acronym "CD" designates the direct coupling, that is, the resistive coupling, and acronym "CC" designates the capacitive coupling. As can be observed, the absorption of reference bolometer 120 does not exceed 1% in the considered frequency range between 2 THz and 3 THz. Reference bolometer 120 is thus desensitized to the terahertz radiation detected by sensitive bolometer 50 while being sensitive to infrared radiation.

According to a second embodiment, the reference bolometer differs from reference bolometer 120 in that resistive load 66 is omitted.

According to a third embodiment, the reference bolometer differs from reference bolometer 120 in that the resistive load is shorted. The absence or the shorting of resistive load 66 thus enables to reject possible resonance resulting from a patch antenna behavior, outside of the active detector operating range, while providing substantially identical results in terms of infrared absorption than the first embodiment.

The embodiments just described have the advantage of providing a reference bolometer having a very small number of differences with respect to the sensitive bolometer, which especially enables to manufacture these bolometers jointly by means of the same manufacturing techniques. Of course, the reference bolometer may differ by greater proportions from the sensitive bolometer. For example, the reference bolometer may advantageously have no resonant cavity 80, 82.

Similarly, it is always possible to introduce optical fibers to do away with parasitic radiation sources outside of the operating range of sensitive bolometer 50.

A terahertz detector comprising a specific form of sensitive bolometers 50 has been described. Of course, the invention also applies to other types of sensitive bolometers provided to perform the corresponding modifications of the reference bolometers, which are within the abilities of those skilled in the art.

The invention claimed is:
1. A device for detecting a portion in the terahertz range of an electromagnetic radiation comprising at least one elementary bolometric detector, said bolometric detector comprising:
at least one antenna for collecting the portion in the terahertz range of the electromagnetic radiation;
a microbridge suspended above a substrate by electrically-conductive support and thermal insulation arms, the microbridge comprising:
a resistive load coupled to the antenna to convert the electromagnetic power collected by said antenna into thermal power; and
a resistive bolometric element coupled to the resistive load to heat up under the effect of the thermal power generated by said resistive load;
and a bias circuit electrically connected to the bolometric element via the support and thermal insulation arms to electrically bias said bolometric element and generate an electric signal depending on the electric resistance of said bolometric element,
wherein it further comprises:
a skimming circuit comprising:
a microbridge suspended above the substrate by electrically-conductive support and thermal insulation arms, and comprising a resistive bolometric element, the microbridge of the skimming circuit being identical to the microbridge of the elementary bolometric detector in terms of electric resistance, of thermal time constant, and of infrared detection, said microbridge being configured to have the electromagnetic radiation incident thereon;

a reflective metal layer formed on the substrate opposite to the microbridge of the skimming circuit, the distance separating said microbridge from the reflective layer being selected to obtain a destructive interference at the level of said microbridge for a wavelength of the terahertz radiation; and a bias circuit electrically connected to the microbridge of the skimming circuit to electrically bias said circuit and generate an electric signal depending on the electric resistance of said bolometric element; and a read circuit capable of being coupled to the elementary bolometric detector and to the skimming circuit to measure a difference between the electric signals that they generate.

2. The detection device of claim 1, wherein the skimming circuit is arranged so that the corresponding microbridge receives at least part of the incident radiation on the microbridge of the elementary bolometric detector.

3. The detection device of claim 1, wherein the microbridge of the skimming circuit has a structure identical to that of the microbridge of the elementary bolometric detector.

4. The detection device of claim 1, wherein the microbridge of the skimming circuit has a structure which differs from that of the microbridge of the elementary bolometric detector only in that the microbridge of the skimming circuit comprises no resistive load or in that it comprises a resistive load assembled in short-circuit.

5. The detection device of claim 1, wherein a distance e separating the microbridge of the skimming circuit from the reflective layer is lower than one tenth of the wavelength of the terahertz radiation.

6. The detection device of claim 1, wherein the elementary bolometric detector comprises a first and a second crossed bowtie antennas intended to collect the electromagnetic radiation, and wherein the first antenna is arranged outside of the microbridge of the skimming circuit and is capacitively coupled with the resistive load, and wherein the second antenna is arranged in the microbridge of the skimming circuit in resistive coupling with the resistive load.

7. The detection device of claim 6, wherein the resistive load of the microbridge of the elementary bolometric detector comprises a metal film, and wherein the microbridge of the elementary bolometric detector comprises fins arranged opposite to the first antenna on the metal film and in capacitive coupling therewith to achieve an impedance matching between the first antenna and the metal film.

8. The detection device of claim 7, wherein the fins are covered with an electric insulator, the thermometric element of the microbridge of the elementary bolometric detector being at least partially arranged on said insulator and at least partially in contact with the metal film.

9. The detection device of claim 6, wherein the resistive load of the microbridge of the elementary bolometric detector comprises a metal film, and wherein the second antenna is at least partially arranged on this metal film.

10. The detection device of claim 6, wherein the first antenna is arranged on the substrate.

11. The detection device of claim 1, wherein it comprises a one- or two-dimensional array of elementary bolometric detectors, and wherein it comprises a skimming circuit associated with each column of said array.

12. The detection device of claim 1, wherein the reflective metal layer has a surface area greater than or equal to the projected surface area of the microbridge of the skimming circuit.

* * * * *